(12) United States Patent
Zhang et al.

(10) Patent No.: US 12,301,741 B2
(45) Date of Patent: May 13, 2025

(54) FOLDING MECHANISM AND MOBILE TERMINAL

(71) Applicant: HONOR DEVICE CO., LTD., Shenzhen (CN)

(72) Inventors: Yaolei Zhang, Shenzhen (CN); Jian Sun, Shenzhen (CN); Longlong Gong, Shenzhen (CN); Haifei Li, Shenzhen (CN); Mingqian Gao, Shenzhen (CN); Bin Yan, Shenzhen (CN); Guotong Zhou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/791,351

(22) PCT Filed: Jan. 29, 2022

(86) PCT No.: PCT/CN2022/075010
§ 371 (c)(1),
(2) Date: Jul. 7, 2022

(87) PCT Pub. No.: WO2022/193863
PCT Pub. Date: Sep. 22, 2022

(65) Prior Publication Data
US 2024/0357025 A1     Oct. 24, 2024

(30) Foreign Application Priority Data
Mar. 15, 2021 (CN) .......................... 202110275248.9

(51) Int. Cl.
*G06F 1/16*     (2006.01)
*H04M 1/02*     (2006.01)

(52) U.S. Cl.
CPC ......... *H04M 1/022* (2013.01); *H04M 1/0268* (2013.01)

(58) Field of Classification Search
CPC ... H04M 1/022; H04M 1/0268; G06F 1/1681; G06F 1/1616; G06F 1/1652; F16C 11/045; F16C 11/12
See application file for complete search history.

(56) References Cited

U.S. PATENT DOCUMENTS 11,336,759 B2 *   5/2022   Liao ...................... H04M 1/022
11,737,223 B2 *   8/2023   Lee ..................... H04M 1/0216
                                                                       361/809

(Continued)

FOREIGN PATENT DOCUMENTS

CN     110784570 A     2/2020
CN     111692196 A     9/2020

(Continued)

*Primary Examiner* — Angelica Perez

(57) ABSTRACT

Embodiments of this application disclose a folding mechanism and a mobile terminal. The folding mechanism includes a bracket and two support assemblies, with the two support assemblies respectively located on two sides of the bracket in a width direction. The support assembly includes a first support, a second support, and a swing arm, with the second support and the swing arm located on a same side of the first support. Because the second support and the first support are slidably connected rather than pivotally connected, the second support and the first support can be considered as one telescopic rod as a whole. Therefore, the bracket, the second support, the first support, and the swing arm form an equivalent three-rod linkage mechanism. In comparison with the related art, one linkage rod is saved, shortening a tolerance chain, which helps reducing a total tolerance of the folding mechanism.

16 Claims, 12 Drawing Sheets

(56) References Cited

U.S. PATENT DOCUMENTS

| | | | |
|---|---|---|---|
| 12,047,521 B2 * | 7/2024 | Liao | H04M 1/022 |
| 12,082,359 B2 * | 9/2024 | Wang | F16C 11/04 |
| 2020/0162598 A1 | 5/2020 | Si | |
| 2020/0371553 A1 | 11/2020 | Hsu | |
| 2021/0267076 A1 * | 8/2021 | Zhang | H05K 5/0226 |
| 2021/0267077 A1 * | 8/2021 | Zhang | H05K 5/0221 |
| 2021/0271294 A1 * | 9/2021 | Liao | G06F 1/181 |
| 2021/0355988 A1 | 11/2021 | Cheng et al. | |
| 2021/0373612 A1 * | 12/2021 | Hwang | G06F 1/1616 |
| 2022/0116489 A1 | 4/2022 | Nagai et al. | |
| 2022/0120124 A1 * | 4/2022 | Quynh | E05D 3/122 |
| 2022/0217228 A1 | 7/2022 | Hu et al. | |
| 2022/0261040 A1 * | 8/2022 | Liu | G06F 1/1679 |
| 2023/0229203 A1 * | 7/2023 | Hsiang | G06F 1/1681 |
| | | | 361/679.27 |

FOREIGN PATENT DOCUMENTS

| | | | |
|---|---|---|---|
| CN | 112153178 A | 12/2020 | |
| CN | 112333308 A | 2/2021 | |
| EP | 3910919 A1 | 11/2021 | |
| WO | 2020173269 A1 | 9/2020 | |

* cited by examiner

FOLDING MECHANISM AND MOBILE TERMINAL

This application is a national stage of International Application No. PCT/CN2022/075010, filed on Jan. 29, 2022, which claims priority to Chinese Patent Application No. 202110275248.9, filed on Mar. 15, 2021. The disclosures of the aforementioned applications are hereby incorporated by reference in their entireties.

TECHNICAL FIELD

This application relates to the field of mobile terminal technologies, and in particular, to a folding mechanism and a mobile terminal including such folding mechanism.

BACKGROUND

With the development of mobile terminal technologies, mobile terminals are used for increasing purposes, becoming one of the important tools for people's daily work and life. Foldable mobile terminals are gradually favored by people for they occupy less space and are easy to carry.

A foldable mobile terminal typically includes two housings, a folding mechanism, and a flexible display. The two housings are respectively connected to two sides of the folding mechanism, able to be opened and closed relative to each other by the folding mechanism. The flexible display is connected to the two housings. When the two housings are opened up, the flexible display spreads flat on the surface of the two housings and the folding mechanism. When the two housings are closed up, the flexible display is folded between the two housings.

As shown in FIG. 1, a folding mechanism in the related art typically includes a bracket 10 and two support assemblies 20, with the two support assemblies 20 respectively located on two sides of the bracket 10 for connecting the two housings (which are not shown in FIG. 1) respectively. Each support assembly 20 includes a swing arm 23, an auxiliary swing arm 24, and a support plate 21. One end of the swing arm 23 is pivotally connected to the bracket 10, and the other end of the swing arm 23 is pivotally connected to the auxiliary swing arm 24. The auxiliary swing arm 24 is pivotally connected to the support plate 21. The support plate 21 is in turn pivotally connected to the bracket 10. An axis of rotation of the swing arm 23 around the bracket 10 is spaced apart from an axis of rotation of the support plate 21 around the bracket 10. The bracket 10, the swing arm 23, the auxiliary swing arm 24, and the support plate 21 form an equivalent four-rod linkage mechanism which has quite many pivotal connections, resulting in a relatively large tolerance of the folding mechanism.

SUMMARY

Embodiments of this application provide a folding mechanism and a mobile terminal, able to overcome the problem in the related art. The technical solutions are as follows:

According to a first aspect, the embodiments of this application provide a folding mechanism, where the folding mechanism includes a bracket and two support assemblies, and the two support assemblies are respectively located on two sides of the bracket in a width direction, are both connected to the bracket, and are able to be opened and closed relative to each other. The support assembly includes a first support, a second support, and a swing arm, with the second support and the swing arm located on a same side of the first support. The second support is pivotally connected to the bracket. The second support is slidably connected to the first support, and the first support is able to slide in a direction approaching or leaving the bracket relative to the second support. One end of the swing arm is pivotally connected to the bracket, and the other end of the swing arm is pivotally connected to the first support. An axis around which the swing arm is pivotally connected to the bracket is spaced apart from an axis around which the second support is pivotally connected to the bracket. When the two support assemblies are closed up relative to each other, the two first supports and the bracket enclose a space for accommodating a flexible display.

Based on the folding mechanism, because the second support and the first support are slidably connected rather than pivotally connected, the second support and the first support can be considered as one telescopic rod as a whole; when the two support assemblies are being opened or closed relative to each other, the second support slides relative to the first support to the effect that length of the telescopic rod is changing. In addition, an axis of rotation of the second support around the bracket is spaced apart from an axis of rotation of the swing arm around the bracket, and therefore the bracket, the second support, the first support, and the swing arm form an equivalent three-rod linkage mechanism. In comparison with the related art, one linkage rod is saved, shortening a tolerance chain, which helps reducing a total tolerance of the folding mechanism.

Optionally, the first support includes a plate body and a guide limiting structure, the guide limiting structure is located on one side of the plate body and is close to the bracket, and the second support is connected to the guide limiting structure. The guide limiting structure has diversified structural forms, and the guide limiting structure can limit the second support to provide direction guiding such that the second support can slide in a specific direction relative to the first support. The guide limiting structure is close to the bracket, so that a distance between the guide limiting structure and the bracket is relatively small, sparing the need to provide a long second support.

In some examples, the guide limiting structure is a guide block, and the guide block is provided with a through hole; the second support is rod-shaped, and is slidably inserted into the through hole; and the second support cooperates with the through hole to limit the sliding direction of the second support.

In some examples, the guide limiting structure includes two ribs and a plurality of stop pieces, where the two ribs are spaced in parallel and the stop pieces are connected to the two ribs respectively. The plate body, the two ribs, and the stop pieces enclose a channel. The second support is plate-shaped and is slidably inserted into the channel. The ribs provide lateral limit for the second support and the stop pieces press against the second support to prevent the second support from being separated from the plate body. Under the limit of the channel, the second support can slide on a surface of the plate body in an extension direction of the channel.

In some examples, the guide limiting structure includes two ribs that are spaced in parallel. A side wall of the rib is provided with a slide groove with the slide grooves of the two ribs opposite each other. Inner walls of the slide grooves and the plate body enclose a guide slot; and the second support is plate-shaped and is slidably inserted into the guide slot. The ribs provide lateral limit for the second support and a baffle presses against the second support to prevent the second support from being separated from the plate body.

Under the limit of the guide slot, the second support is able to slide a surface of the plate body in an extension direction of the guide slot.

In some examples, the first support includes a plate body and two curved arms, and the curved arms are located on one side of the plate body and close to the swing arm. One end of the curved arm is connected to the plate body, and an opening of the curved arm faces towards the plate body. The two curved arms are parallel and spaced apart from each other. A recess is provided on a side of the swing arm close to the plate body, and a bottom of the recess is a curved plane. The curved arms are located in the recess and are able to slide along the bottom of the recess.

Based on the above structure, the curved arms and the recess can cooperate to implement a pivotal connection, and when the first support and the swing arm rotate relatively, the curved arms slide on the surface of the recess. The curved arms have a curved shape and the bottom of the recess is a curved plane. An axis around which the first support and the swing arm rotate relatively is located along an axle center of the curved plane. The position of the axis around which the first support and the swing arm rotate relatively can be changed by just adjusting a radian of the curved plane, allowing more flexible arrangement.

Optionally, a bump is provided at a middle part of the bottom of the recess, and two limit baffles are provided on a surface of the bump. The two limit baffles are located on two opposite sides of the bump in a length direction of the recess, and a gap is present between the limit baffle and the bottom of the recess. The bump is located between the two curved arms, and the curved arms are able to be slidably inserted into the gap.

Based on the above structure, the two limit baffles on the surface of the bump provide limit for the two curved arms respectively, so as to prevent the curved arms from being separated from the recess, allowing the curved arms to slide along the bottom of the recess.

In some examples, an accommodating slot is provided on both two sides of the bracket in the width direction, and the accommodating slot extends in a length direction of the bracket. A bottom of the accommodating slot is provided with a first curved concave region and a second curved concave region, the first curved concave region adjoining the second curved concave region in the width direction of the bracket. The first curved concave region is closer to an edge of the bracket, and the second curved concave region is farther away from the edge of the bracket. A radius of the first curved concave region is smaller than that of the second curved concave region. The swing arm is partly located in the accommodating slot and is in contact with the bottom of the accommodating slot, and is able to slide on the first curved concave region and the second curved concave region.

With the above structure, a process to close the two support assemblies includes a first stage and a second stage. In the first stage, the swing arm slides along a surface of the second curved concave region, and the swing arm rotates around an axle center of the second curved concave region. In the second stage, the swing arm slides along a surface of the first curved concave region, and the swing arm rotates around an axle center of the first curved concave region. The cooperation of the swing arm with the first curved concave region and the second curved concave region makes a larger distance from the first support to the bracket when the support assemblies are closed up, allowing the first supports and the bracket to enclose a larger space for accommodating a folded part of the flexible display In this way, when the flexible display is folded, the flexible display is more smoothly bent, which is conductive to prolonging the service life of the flexible display.

Optionally, the swing arm includes a swing arm main body, a rotating shaft, and a connecting part. The connecting part is located at one end of the swing arm main body in a length direction and the connecting part is curved. A side wall of the rotating shaft is provided with an insertion slot, and the rotating shaft fits around the connecting part through the insertion slot and is able to slide relative to the connecting part. The rotating shaft is located in the accommodating slot and is pivotally connected to the bracket. When the two support assemblies are opened up relative to each other, the connecting part is in contact with the second curved concave region, and when the two support assemblies are closed up relative to each other, an end of the connecting part away from the swing arm main body is in contact with the first curved concave region.

Based on the above structure, in the first stage, the connecting part of the swing arm slides on the second curved concave region, and the swing arm rotates; in the second stage, the connecting part of the swing arm slides on the first curved concave region, and the swing arm rotates around an axle center of the rotating shaft. The cooperation of the connecting part and the rotating shaft with the first curved concave region and the second curved concave region, makes a larger distance from the first support to the bracket when the support assemblies are closed up, allowing the first supports and the bracket to enclose a larger space for accommodating a folded part of the flexible display.

Optionally, a distance between axle centers of the rotating shafts of the two support assemblies is smaller than a distance between axes around which the second supports of the two support assemblies are pivotally connected to the bracket. The axle center of the rotating shaft is closer to the middle part of the bracket than the axis of rotation of the second support around the bracket. As such, when the two support assemblies are closed up, the two first supports have an included angle in between rather than being parallel. Under the limit of the two first supports, a drop-like bend is able to be formed in a bending region of the flexible display.

Optionally, the connecting parts of the two swing arms are staggered in the length direction of the bracket. The staggered arrangement of the connecting parts of the two swing arms can not only avoid contact between the connecting parts of the two swing arms when the two support assemblies are opened up, but also facilitates a less wide bracket, reducing thickness of a mobile terminal in a folded state.

In some examples, the support assembly includes at least two second supports, and second supports of one support assembly are pivotally connected to the bracket around a common axis. The provision of two or more second supports to jointly support and connect the first support allows the first support to move more smoothly when the two support assemblies are being opened or closed.

In some examples, the support assembly includes at least two swing arms, and swing arms of one support assembly are pivotally connected to the bracket around a common axis and are pivotally connected to the first support around a common axis. The first support and the bracket being connected via a plurality of swing arms allow the first support to rotate more smoothly.

According to a second aspect, the embodiments of this application further provide a mobile terminal. The mobile terminal includes a folding mechanism, a first housing, a second housing, and a flexible display. The folding mechanism is the folding mechanism according to the first aspect.

The first housing is connected to one swing arm of the folding mechanism, and the second housing is connected to the other swing arm of the folding mechanism. The folding mechanism, the first housing, and the second housing are located on a same side of the flexible display, and the flexible display is connected to the first housing and the second housing. Because the second support and the first support are slidably connected rather than pivotally connected, the second support and the first support can be considered as one telescopic rod as a whole. When the two support assemblies are being opened or closed relative to each other, the second support slides relative to the first support to the effect that length of the telescopic rod is changing. In addition, the axis of rotation of the second support around the bracket is spaced apart from the axis of rotation of the swing arm around the bracket. Therefore, the bracket, the second support, the first support, and the swing arm form an equivalent three-rod linkage mechanism. In comparison with the related art, one linkage rod is saved, shortening a tolerance chain, which helps reducing a total tolerance of the folding mechanism.

Figure 1:
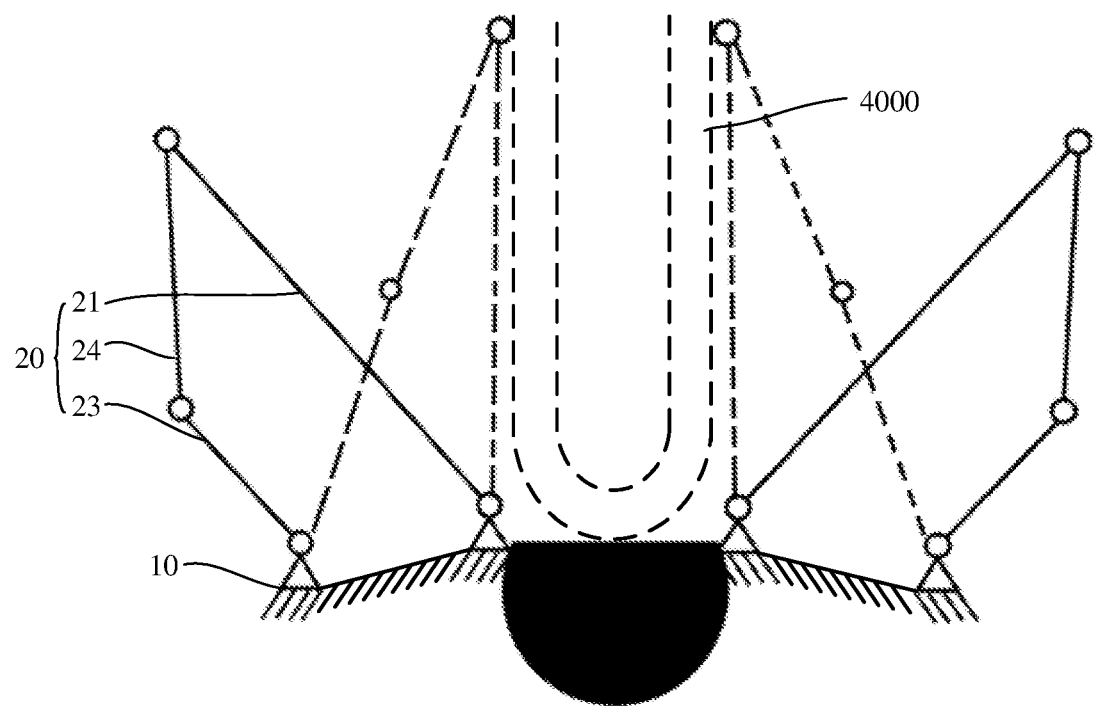
FIG. 1 is a schematic diagram of a folding mechanism of a mobile terminal in a related art.

DESCRIPTION OF REFERENCE SIGNS 10. bracket; 10a. accommodating slot; 10b. first curved concave region; 10c. second curved concave region
11. sub-bracket; 1000. folding mechanism
20. support assembly
21. first support; 21b. channel; 21c. guide slot
210. plate body, 210a. first lateral side, 210b. second lateral side; 211. guide limiting structure
212. guide block; 212a. through hole
213. rib; 213a. connecting hole; 213b. slide groove; 214. stop piece; 216. curved arm; 216a. opening
22. second support
23. swing arm; 23a. recess; 231. connecting part; 231a. notch
232. swing arm main body; 2321. bump; 23211. limit baffle
233. rotating shaft; 233a. insertion slot; 24. auxiliary swing arm
2000. first housing
30. hinge pin; 3000. second housing; 4000. flexible display
X. width direction; Y. length direction

DETAILED DESCRIPTION OF EMBODIMENTS

Terms used in the embodiments of this application are merely intended to describe the embodiments of this application rather than to limit this application. Unless otherwise defined, technical terms or scientific terms used in the embodiments of this application should have general meanings as understood by persons of ordinary skill in the field of this application. Terms "first", "second", "third", and the like used in the specification and claims of this application do not indicate any sequence, quantity or significance, but are only used to distinguish different elements. Similarly, terms such as "one" or "a/an" do not indicate quantitative limitation, but indicate presence of at least one. Terms such as "include" and "contain" mean that an element or object appearing in front of "include" or "contain" is inclusive of elements or objects listed behind "include" or "contain" and their equivalents, without excluding other elements or objects. Terms such as "connect" and "attach" are not limited to referring to physical or mechanical connections, but rather may include electrical connections, whether direct or indirect. "Upper", "lower", "left", "right", and the like are only intended to indicate relative positional relationships. When an absolute position of a described object changes, the relative position relationship may also change accordingly.

Referring to FIG. 1, a folding mechanism in a related art includes a bracket 10 and two support assemblies 20. The two support assemblies 20 are both connected to the bracket 10 and are able to be opened and closed relative to each other. A closed state of the folding mechanism is illustrated in the figure using dotted lines. When the two support assemblies 20 are closed up, a flexible display 4000 of a mobile terminal is in a folded state. The support assembly 20 includes a swing arm 23, an auxiliary swing arm 24, and a support plate 21. One end of the swing arm 23 is pivotally connected to the bracket 10, and the other end of the swing arm 23 is pivotally connected to the auxiliary swing arm 24. The auxiliary swing arm 24 is pivotally connected to the support plate 21. The support plate 21 is in turn pivotally connected to the bracket 10. An axis of rotation of the swing arm 23 around the bracket 10 is spaced apart from an axis of rotation of the support plate 21 around the bracket 10. The support assembly 20 can be considered as a four-rod linkage mechanism with four pivot joints. During assembling, each pivot joint is subjected to some tolerance, which leads to a longer tolerance chain and a relatively large total tolerance of the folding mechanism.

Figure 2:
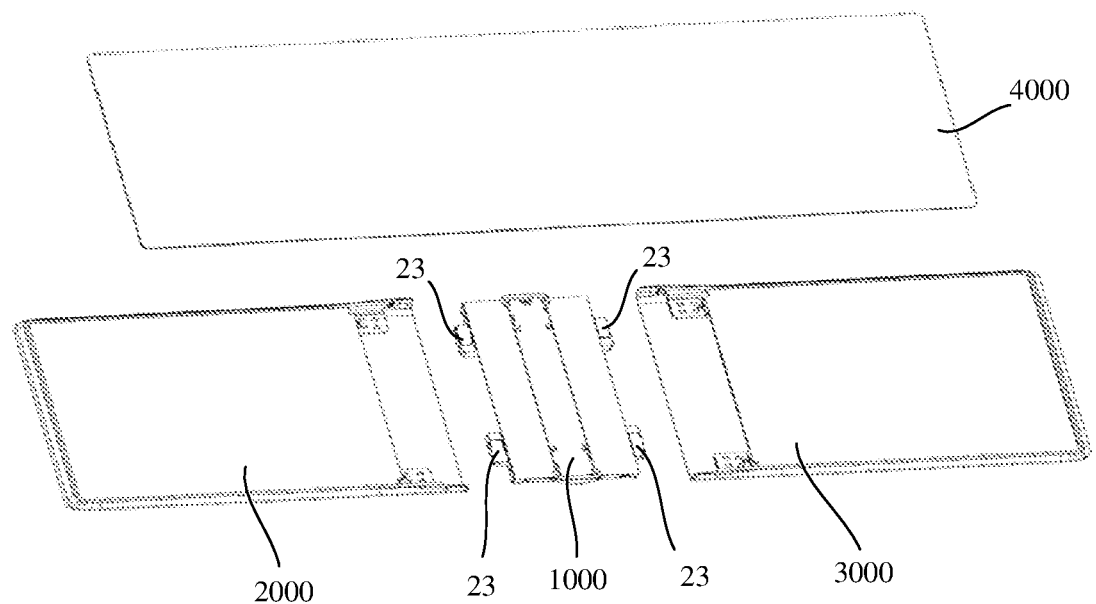
FIG. 2 is a schematic structural diagram of a mobile terminal according to an embodiment of this application.

FIG. 2 is a schematic structural diagram of a mobile terminal according to an embodiment of this application, and the mobile terminal may be, but not limited to, a mobile phone, a tablet personal computer, and a display. As shown in FIG. 2, the mobile terminal includes a folding mechanism 1000, a first housing 2000, a second housing 3000, and a flexible display 4000. The folding mechanism 1000 is located between the first housing 2000 and the second housing 3000, a swing arm 23 on one side of the folding mechanism 1000 is connected to the first housing 2000, and a swing arm 23 on the other side of the folding mechanism 1000 is connected to the second housing 3000. The folding mechanism 1000, the first housing 2000, and the second housing 3000 are located on a same side of the flexible display 4000, and the flexible display 4000 is connected to the first housing 2000 and the second housing 3000.

The first housing 2000 and the second housing 3000 is able be to opened and closed relative to each other. When the first housing 2000 and the second housing 3000 are opened up, the flexible display 4000 spreads flat on a surface of the folding mechanism 1000, the first housing 2000, and the second housing 3000. When the first housing 2000 and the second housing 3000 are closed up relative to each other, the flexible display 4000 is folded between the first housing 2000 and the second housing 3000.

Figure 3:
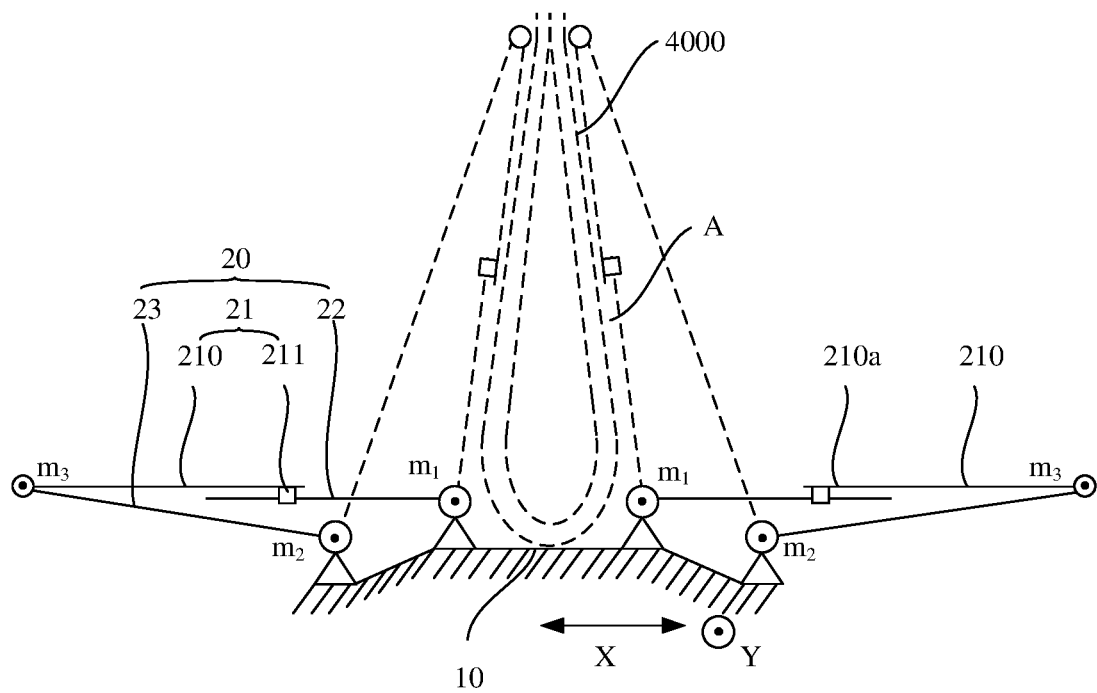
FIG. 3 is a schematic diagram of a folding mechanism according to an embodiment of this application.

FIG. 3 is a schematic diagram of a folding mechanism according to an embodiment of this application. As shown in FIG. 3, the folding mechanism includes a bracket 10 and two support assemblies 20, where the two support assemblies 20 are respectively located on two sides of the bracket 10 in a width direction X, and are both connected to the bracket 10. Two states of the folding mechanism are shown in FIG. 3, where the two support assemblies 20 is able to be opened and closed relative to each other. When the two support assemblies 20 are closed up relative to each, the two support assemblies 20 and the bracket 10 enclose a space A for accommodating the flexible display 4000.

The support assembly 20 includes a first support 21, a second support 22, and a swing arm 23. The second support 22 and the swing arm 23 are located on a same side of the first support 21. The second support 22 is pivotally connected to the bracket 10 and is slidably connected to the first support 21, and the first support 21 is able to slide in a direction approaching or leaving the bracket 10 relative to the second support 22.

One end of the swing arm 23 is pivotally connected to the bracket 10, and the other end of the swing arm 23 is pivotally connected to the first support 21. In FIG. 3, an axis around which the second support 22 is pivotally connected to the bracket 10 is $m_1$, an axis around which the swing arm 23 is pivotally connected to the bracket 10 is $m_2$, and an axis around which the swing arm 23 is pivotally connected to the first support 21 is $m_3$. The axis $m_1$, the axis $m_2$, and the axis $m_3$ all extend in a length direction of the bracket 10. The axis $m_2$ around which the swing arm 23 is pivotally connected to the bracket 10 is spaced apart from an axis $m_1$ around which the second support 22 is pivotally connected to the bracket 10.

The second support and the swing arm provided and connected to the first support, with the second support slidably connected to the first support and the swing arm pivotally connected to the first support. Because the second support and the first support are slidably connected rather than pivotally connected, the second support and the first support can be considered as one telescopic rod as a whole. When the two support assemblies are being opened or closed relative to each other, the second support slides relative to the first support to the effect that length of the telescopic rod is changing. In addition, the axis of rotation of the second support around the bracket is spaced apart from the axis of rotation of the swing arm around the bracket. Therefore, the bracket, the second support, the first support, and the swing arm form an equivalent three-rod linkage mechanism. In comparison with the related art, one linkage rod is saved, shortening a tolerance chain, which helps reducing a total tolerance of the folding mechanism.

Figure 4:
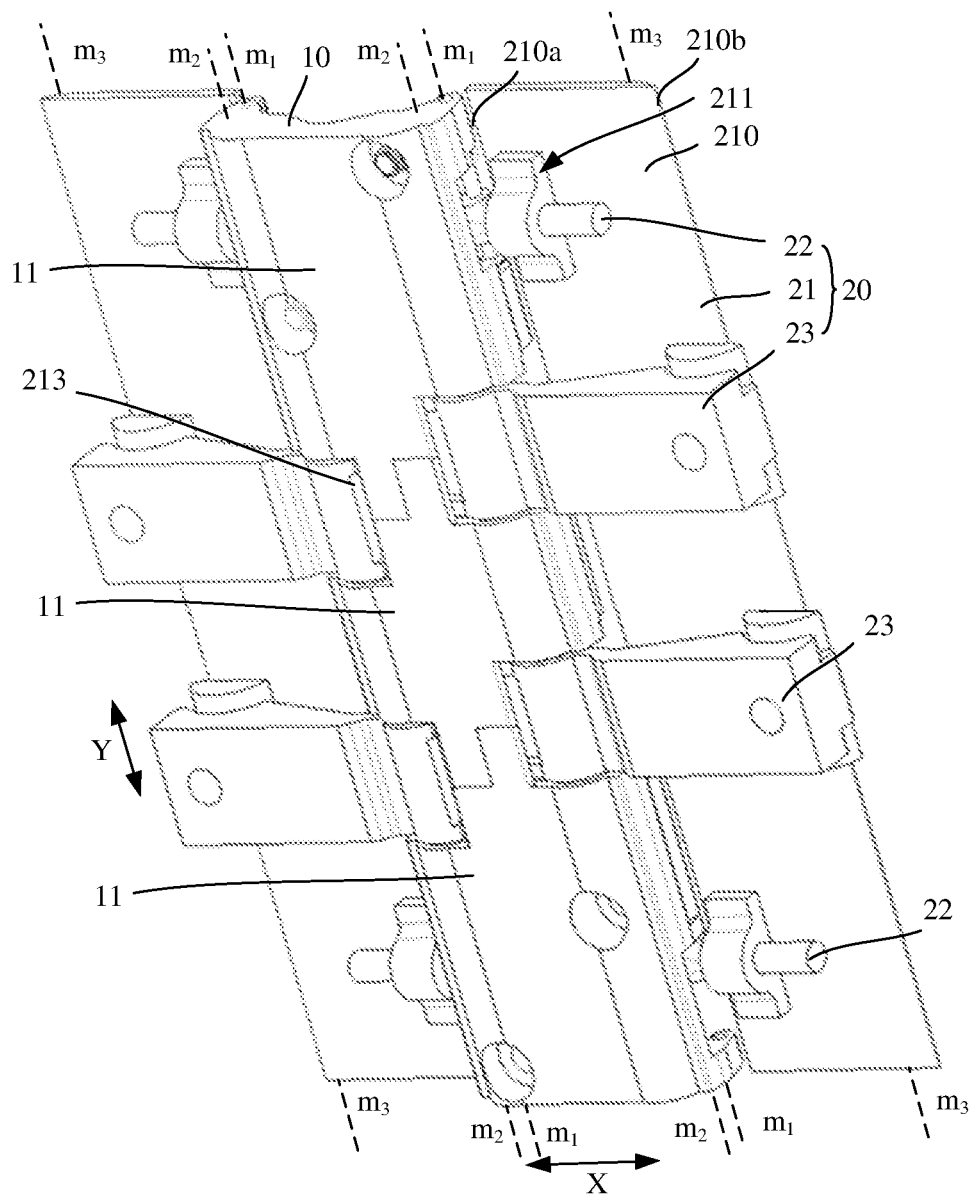
FIG. 4 is a schematic structural diagram of a folding mechanism according to an embodiment of this application.

FIG. 4 is a schematic structural diagram of a folding mechanism according to an embodiment of this application. As shown in FIG. 4, the bracket 10 includes a a plurality of sub-brackets 11 detachably connected in a length direction of the bracket. A cross section of the bracket 10 is U-shaped, the support assemblies 20 are connected on two sides of the bracket 10, and a sunken region in the middle of the bracket 10 can be used for accommodating a folded part of the flexible display.

The bracket 10 is an important structure in a mobile terminal, which not only connects to some structures in the folding mechanism but often also used for mounting other components in the mobile terminal. Therefore, the bracket 10 has quite mounting structures. The provision of the bracket 10 is as a plurality of sub-brackets 11 allows for assembling after section by section manufacturing, which facilitates the ease of making various mounting structures on the bracket 10.

In other examples, the plurality of sub-brackets 11 are fixedly connected, meaning that the bracket 10 is a one-piece construction, which enables the bracket 10 to have a greater structural strength.

Optionally, each support assembly 20 includes at least two swing arms 23, and swing arms 23 of one support assembly 20 are pivotally connected to the bracket 10 around a common axis $m_2$ and are pivotally connected to the first support 21 around a common axis $m_3$. The swing arms 23 of the two support assemblies 20 are staggered in a length direction Y of the bracket 10.

The bracket 10 has some length, and the first support 21 and the bracket 10 being connected via a plurality of swing arms 23 allow the first support 21 to rotate more smoothly when the two support assemblies are being opened or closed.

Illustratively, each support assembly 20 includes two swing arms 23, with one of the swing arms 23 close to one end of the bracket 10 in a length direction Y and the other swing arm 23 close to the other end of the bracket 10 in the length direction Y.

In some examples, each support assembly 20 may alternatively include only one swing arm 23, so as to simplify the structure and reduce the volume of the folding mechanism. Such design is more suitable for small mobile terminals.

Optionally, each support assembly 20 includes at least two second supports 22, and second supports 22 of one support assembly 20 are pivotally connected to the bracket 10 around a common axis $m_1$. The provision of two or more second supports 22 to jointly support and connect the first support 21 allows the first support 21 to move more smoothly when the two support assemblies 20 are being opened or closed.

Illustratively, the plurality of second supports 22 in one support assembly 20 are spaced in sequence along the length direction Y of the bracket 10 to provide spaced support points for the first support 21, allowing the first support 21 to move smoothly.

In some examples, each support assembly 20 may alternatively include only one second support 22, so as to simplify the structure and reduce the volume of the folding mechanism. Such design is more suitable for small mobile terminals.

As shown in FIG. 3, the first support 21 includes a plate body 210 and a guide limiting structure 211. The guide limiting structure 211 is located on one side of the plate body 210 and close to the bracket 10, and the second support 22 is connected to the guide limiting structure 211. The guide limiting structure 211 can limit the second support 22 to provide direction guiding such that the second support 22 can slide in a specific direction relative to the first support 21.

Optionally, the guide limiting structure 211 is close to a first lateral side 210a of the plate body 210, and the first lateral side 210a of the plate body 210 is a side of the plate body 210 close to the bracket 10. This allows a relatively small distance between the guide limiting structure 211 and the bracket 10, which helps reducing length of the second support 22.

In an example, the guide limiting structure 211 is a guide block 212.

Figure 5:
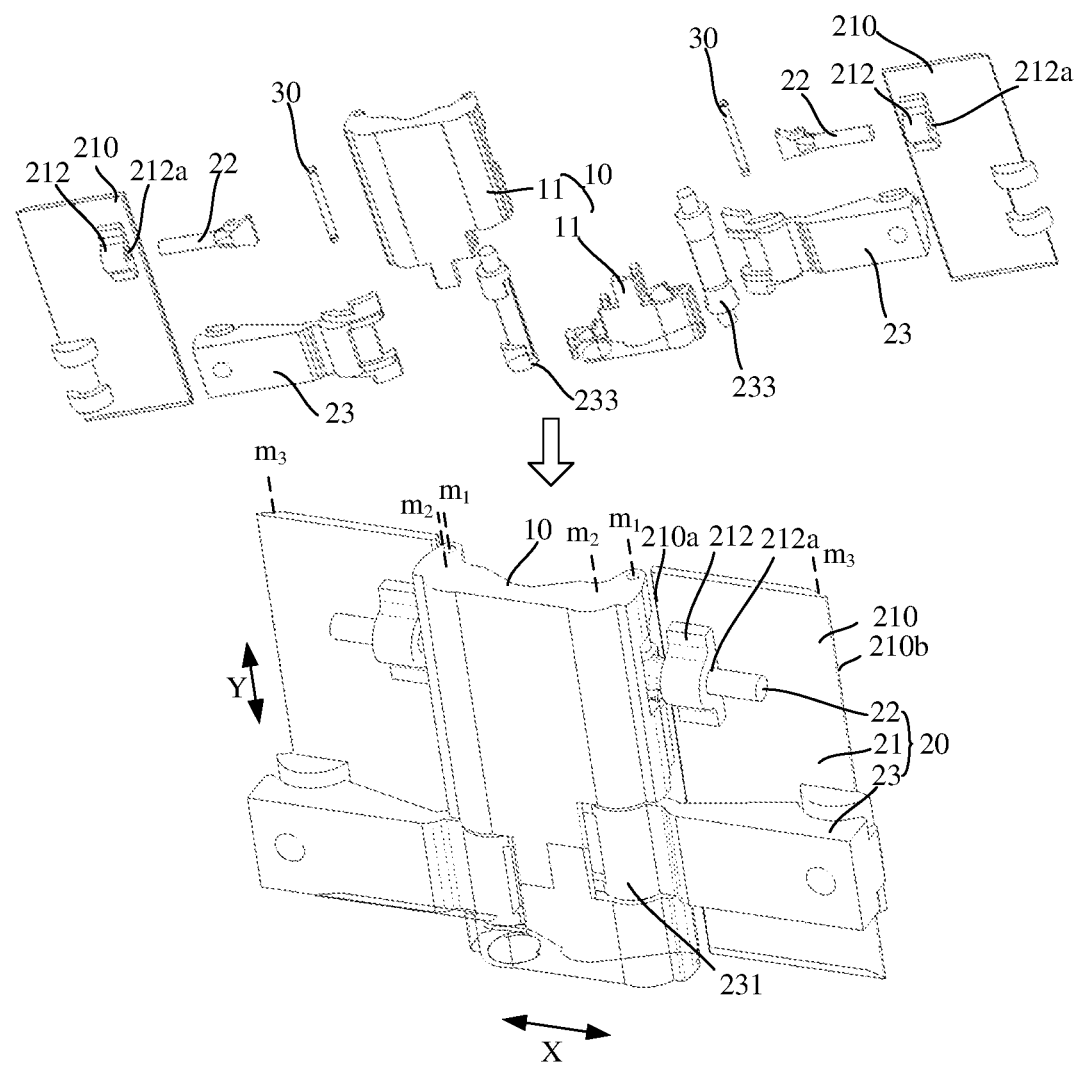
FIG. 5 is a schematic diagram of assembling of a folding mechanism according to an embodiment of this application.

FIG. 5 is a schematic diagram of assembling of a folding mechanism according to an embodiment of this application. As shown in FIG. 5, the first support 21 includes a plate body 210 and a guide block 212. The guide block 212 is located on a side of the plate body 210 close to the second support 22, and is connected to the plate body 210. The guide block 212 is provided with a through hole 212a.

The second support 22 is rod-shaped, and is slidably inserted into the through hole 212a. The second support 22 is in clearance fit with the through hole 212a, so that the second support 22 is able to slide in the through hole 212a.

In an example, in this embodiment of this application, the through hole 212a in the guide block 212 is a circular hole, and in other examples, the through hole 212a may alternatively be an oval hole or a square hole or of other shapes.

The guide block 212 is close to the first lateral side 210a of the plate body 210, which allows a relatively small distance between the guide block 212 and the bracket 10, sparing the need to provide a long second support 22.

Optionally, the guide block 212 and the plate board 210 are an integrally formed structure. Integral formation of the guide block 212 and the plate body 210 facilitates the ease of manufacture.

As another example, the guide limiting structure 211 includes two ribs 213 and a plurality of stop pieces 214.

Figure 6:
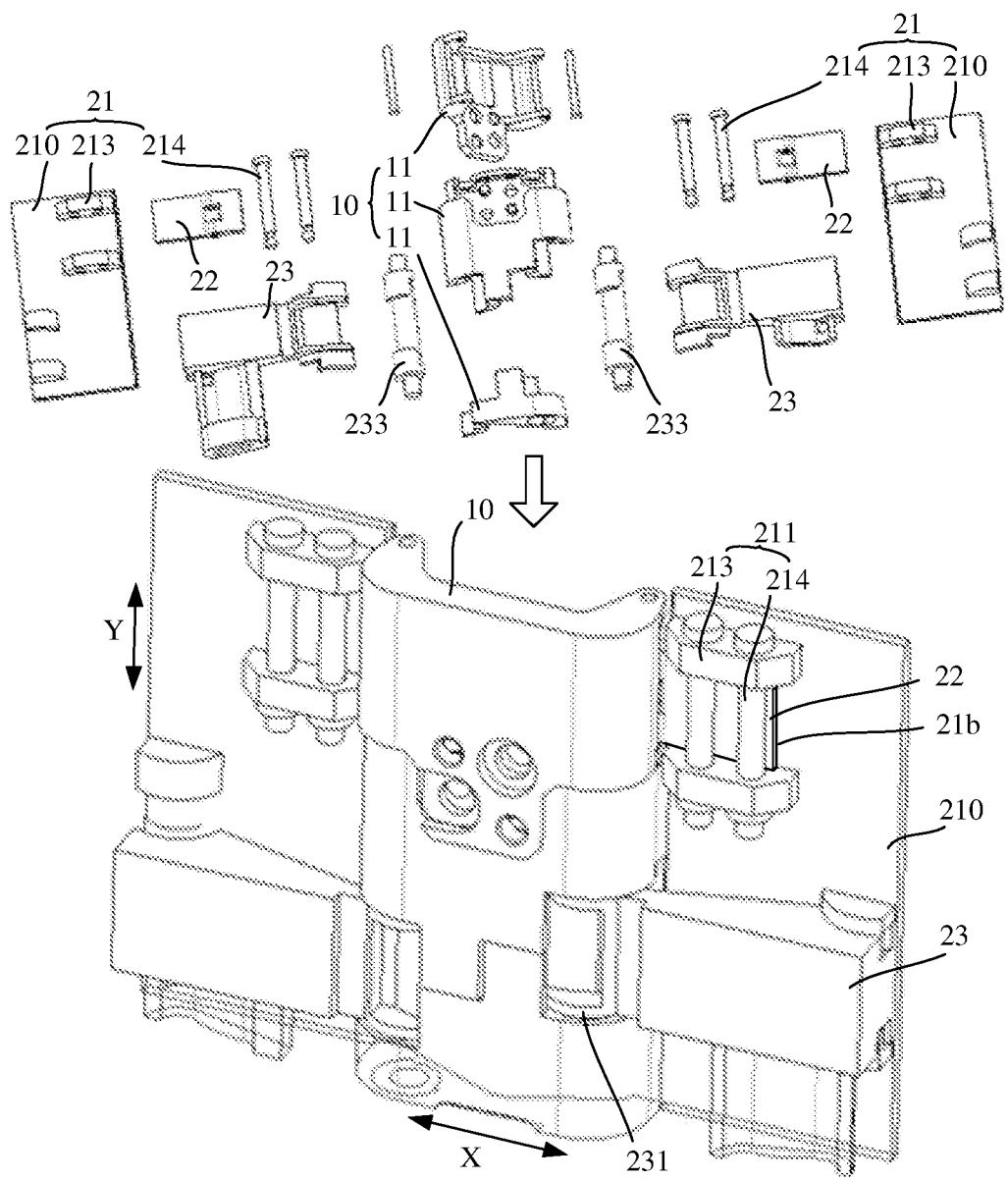
FIG. 6 is a schematic diagram of assembling of a folding mechanism according to an embodiment of this application.
Figure 7:
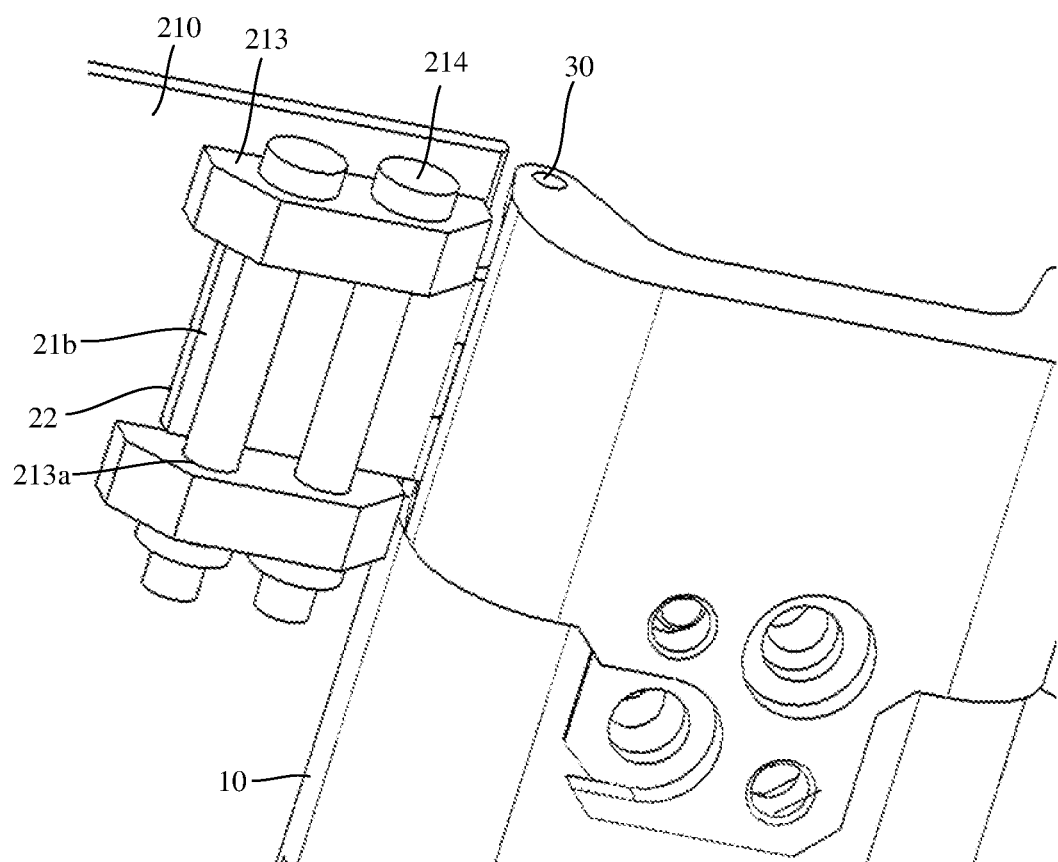
FIG. 7 is a schematic diagram of a local enlargement of the folding mechanism shown in FIG. 6.

FIG. 6 is a schematic diagram of assembling of a folding mechanism according to an embodiment of this application. As shown in FIG. 6, in the folding mechanism, the first support 21 includes a plate body 210, two ribs 213, and two stop pieces 214. The two ribs 213 are spaced in parallel, and the stop pieces 214 are connected to the two ribs 213 respectively. FIG. 7 is a schematic diagram of a local enlargement of the folding mechanism shown in FIG. 6. As shown in FIG. 7, the plate body 210, the two ribs 213, and the stop pieces 214 enclose a channel 21b. The second support 22 is plate-shaped and is slidably inserted into the channel 21b.

The second support 22 is inserted into the channel 21b, the two ribs 213 provide lateral limit for the second support 22, and the stop pieces 214 prevent the second support 22 from being separated from the plate body 210, so that the second support 22 is limited in the channel 21b. Under the limit of the channel 21b, the second support 22 is able to slide on a surface of the plate body 210 in an extension direction of the channel.

The ribs 213 are close to the first lateral side 210a of the plate body 210, so as to shorten a distance between the channel 21b and the bracket 10, sparing the need to provide a long second support 22.

As shown in FIG. 7, a side wall of the rib 213 is provided with a connecting hole 213a, and the stop piece 214 is inserted into the connecting hole 213a. A quantity of connecting holes 213a that each rib 213 has is the same as a quantity of stop pieces 214. The connecting hole 213a matches the stop piece 214 in shape, so as to accommodate the stop piece 214, allowing the stop piece 214 to be inserted into the connecting hole 213a.

In an example, the stop piece 214 shown in FIG. 7 is a stop lever, and the first support 21 includes two stop levers; in other examples, the first support 21 may alternatively include other quantities of stop levers, for example, one stop lever or three stop levers.

Optionally, the stop lever is a pin which is easy to connect. Upon formation of the rib 213, the pin is directly secured into the connecting hole 213a of the rib 213 to form the guide limiting structure 211.

In some examples, the stop piece 214 is a baffle. The first support 21 may include one baffle or two or more baffles.

Optionally, the rib 213 and the plate body 210 are an integrally formed structure. Integral formation of the rib 213 and the plate body 210 facilitates the ease of manufacture.

In another example, the guide limiting structure 211 includes two ribs 213.

Figure 8:
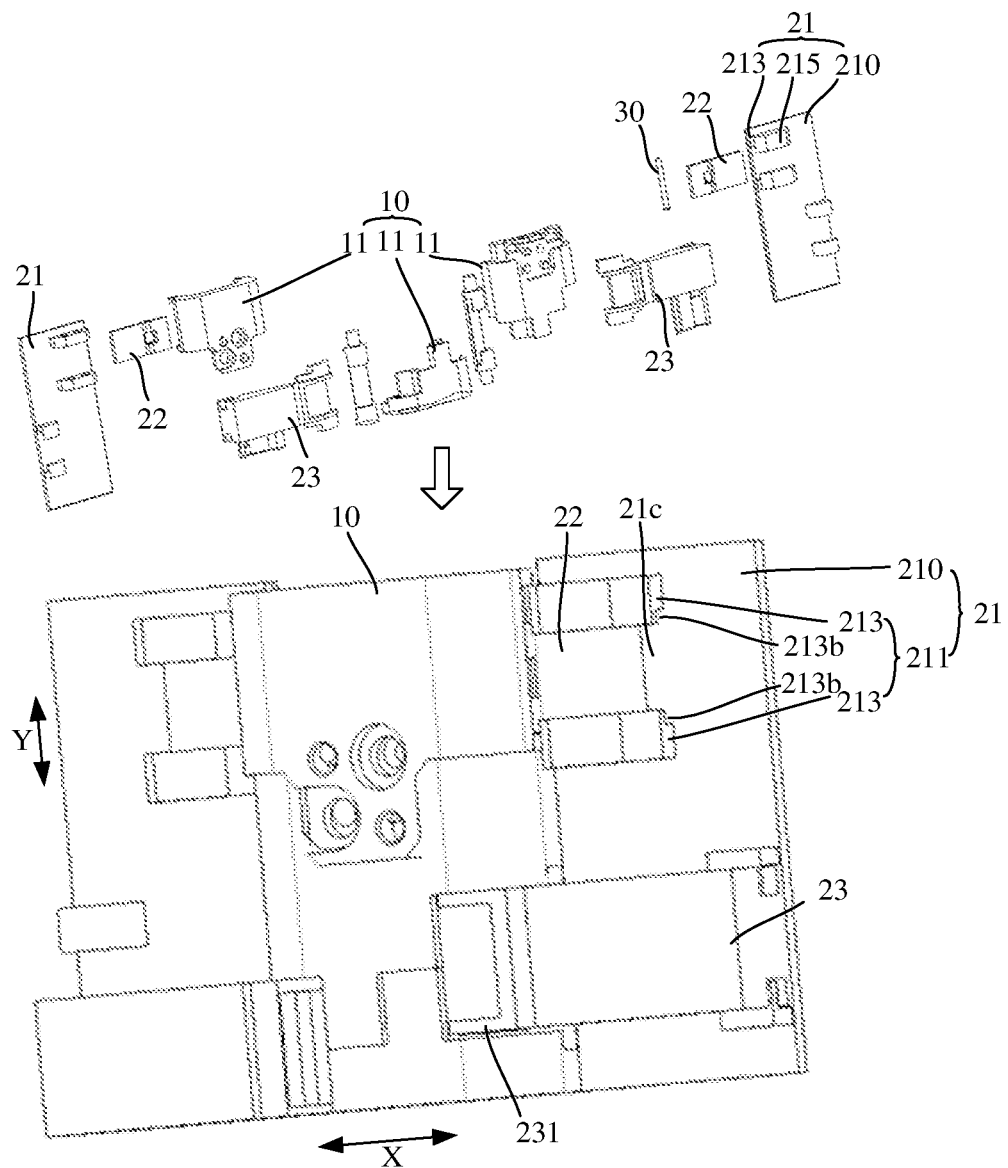
FIG. 8 is a schematic diagram of assembling of a folding mechanism according to an embodiment of this application.
Figure 9:
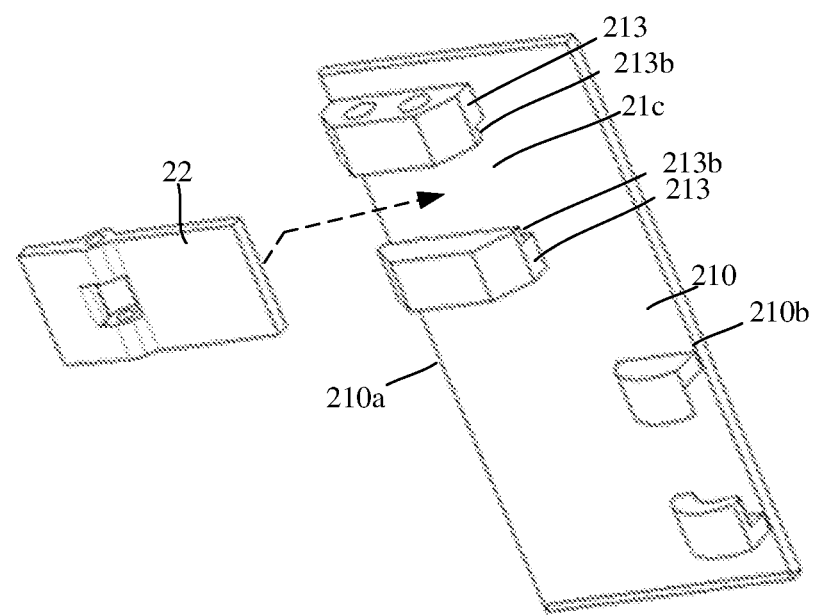
FIG. 9 is a schematic diagram of a local enlargement of the folding mechanism shown in FIG. 8.

FIG. 8 is a schematic diagram of assembling of a folding mechanism according to an embodiment of this application. As shown in FIG. 8, in the folding mechanism, the first support 21 includes a plate body 210 and two ribs 213. FIG. 9 is a schematic diagram of a local enlargement of the folding mechanism shown in FIG. 8. As shown in FIG. 9, the two ribs 213 are spaced in parallel, a side wall of the rib 213 is provided with a slide groove 213b with the slide grooves 213b of the two ribs 213 opposite each other. Inner walls of the slide grooves 213b and the plate body 210 enclose a guide slot 21c; and the second support 22 is plate-shaped and is slidably inserted into the guide slot 21c.

The second support 22 is inserted into the guide slot 21c, the two ribs 213 provide lateral limit for the second support 22, and the slide grooves 213b prevent the second support 22 from being separated from the plate body 210. Under the limit of the guide slot 21c, the second support 22 is able to slide on the surface of the plate body 210 in an extension direction of the guide slot.

The ribs 213 are close to the first lateral side 210a of the plate body 210, so as to shorten a distance between the guide slot 21c and the bracket 10; accordingly, sparing the need to provide a long second support 22.

Optionally, the rib 213 and the plate body 210 are an integrally formed structure. Integral formation of the ribs 213 and the plate body 210 makes the guide slot 21c immediately, which facilitates the ease of manufacture.

Optionally, the second support 22 is rod-shaped or plate-shaped. For example, in the folding mechanism shown in FIG. 5, the second support 22 is rod-shaped, and in the folding mechanisms shown in FIG. 6 and FIG. 8, the second support 22 is plate-shaped. Shape of the second support 22 is designed in accordance with the structure of the guide limiting structure 211, such that the second support 22 is able to slide relative to the first support 21, without ease of separating from the first support 21. The second support 22 and the bracket 10 are pivotally connected by a hinge pin 30, so that second support 22 is able to rotate flexibly relative to the bracket 10.

Figure 10:
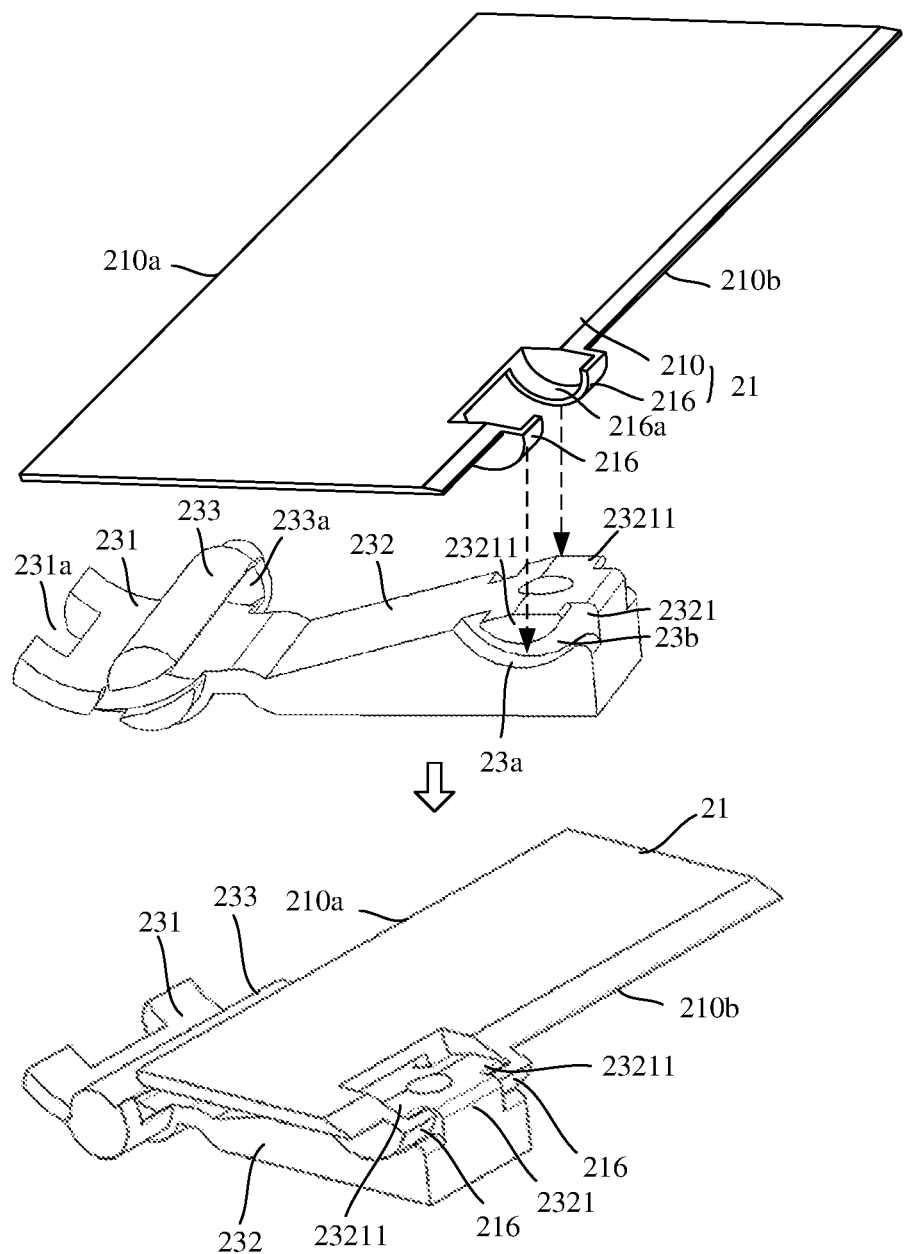
FIG. 10 is a schematic diagram of connecting of a swing arm and a first support according to an embodiment of this application.

FIG. 10 is a schematic diagram of connecting of a swing arm and a first support according to an embodiment of this application. As shown in FIG. 10, the first support 21 includes a plate body 210 and two curved arms 216, and the curved arms 216 are located on one side of the plate body 210 and are close to the swing arm 23. One end of the curved arm 216 is connected to the plate body 210, and an opening 216a of the curved arm 216 faces towards the plate body 210. The two curved arms 216 are parallel and spaced apart from each other. In this embodiment of this application, the curved arms 216 are located on a second lateral side 210b of the plate body 210, where the second lateral side 210b of the plate body 210 is a side opposite the first lateral side 210a of the plate body 210.

A recess 23a is provided on a side of the swing arm 23 close to the plate body 210, and a bottom of the recess 23a is a curved plane. The curved arms 216 are located in the recess 23a and are able to slide along the bottom of the recess 23a.

The curved arms 216 are connected to the recess 23a of the swing arm 23, with the surface of the curved arms 216 in contact with the bottom of the recess 23a. Because the curved arms 216 have a curved shape and the bottom of the recess 23a is a curved plane, the curved arms 216 are able to slide along the bottom of the recess 23a, and the first support 21 is able to rotate around an axle center of the curved plane relative to the swing arm 23.

In the related art, a rod-shaped structure such as a pin is often used for a pivotal connection, a position of an axis of rotation being limited by a position of the pin and the axis of rotation being coincident with an axis of the pin. In this embodiment of this application, the curved arms 216 and the recess 23a can cooperate to implement a pivotal connection. The curved arms 216 have a curved shape and the bottom of the recess 23a is a curved plane. An axis around which the first support 21 and the swing arm 23 rotate relatively is located along an axle center of the curved plane. The position of the axis can be changed by just adjusting a radian of the curved plane, without being limited by structures such as pins, thereby allowing more flexible arrangement.

As shown in FIG. 10, a bump 2321 is provided at a middle part of the bottom of the recess 23a, and two limit baffles 23211 are provided on a surface of the bump 2321. The two limit baffles 23211 are located on two opposite sides of the bump 2321 in a length direction of the recess 23a, and a gap 23a is present between the limit baffle 23211 and the bottom of the recess 23a. The bump 2321 is located between the two curved arms 216, and the curved arms 216 are able to be slidably inserted into the gap 23b.

When connecting the first support 21 and the swing arm 23, the curved arms 216 are inserted between the baffle 23211 and the recess 23a, and the curved arms 216 are in contact with the bottom of the recess 23a under a limit action of the baffle 23211, so as to prevent the curved arms 216 from being separated from the swing arm 23.

As shown in FIG. 10, a surface of the limit baffle 23211 close to the recess 23a is a curved convex surface. The curved convex surface cooperates with the curved arm 216, so that the limit baffle 23211 has a relatively large contact area with the curved arm 216, and relative rotation between the first support 21 and the swing arm 23 is smoother.

Optionally, an axle center of the curved convex surface of the limit baffle 23211 is coincident with an axle center of the bottom of the recess 23a, allowing smoother relative rotation between the first support 21 and the swing arm 23.

Optionally, a radius difference between the curved convex surface of the limit baffle 23211 and the bottom of the recess 23a is equal to the thickness of the curved arm 21, so that two sides of the curved arm 21 can be in contact with the limit baffle 23211 and the bottom of the recess 23a when the curved arm 216 is inserted between the limit baffle 23211 and the bottom of the recess 23a, allowing smoother relative rotation between the first support 21 and the swing arm 23.

Figure 11:
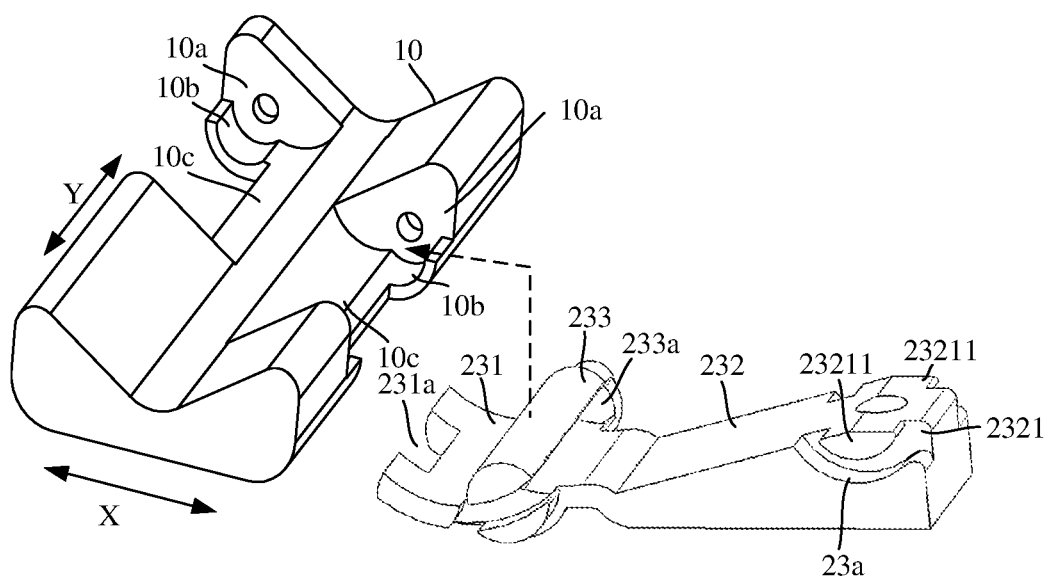
FIG. 11 is a schematic diagram of connecting of a bracket and a swing arm according to an embodiment of this application.

FIG. 11 is a schematic diagram of connecting of a bracket and a swing arm according to an embodiment of this application, with only part of the of the bracket 10 shown.

As shown in FIG. 11, an accommodating slot 10a is provided on each of two sides of the bracket 10 in the width direction X, and the accommodating slot 10a extends in a length direction Y of the bracket 10. A bottom of the accommodating slot 10a is provided with a first curved concave region 10b and a second curved concave region 10c, the first curved concave region 10b adjoining the second curved concave region 10c in the width direction X of the bracket 10. The first curved concave region 10b is closer to an edge of the bracket 10, and the second curved concave region 10c is farther away from the edge of the bracket 10. A radius of the first curved concave region 10b is smaller than that of the second curved concave region 10c. The swing arm 23 is partly located in the accommodating slot 10a and is in contact with the bottom of the accommodating slot 10a, and is able to slide on the first curved concave region 10b and the second curved concave region 10c.

The swing arm 23 includes a swing arm main body 232, a rotating shaft 233, and a connecting part 231. The connecting part 231 is located at one end of the swing arm main body 232 in a length direction and the connecting part 231 is curved. A side wall of the rotating shaft 233 is provided with an insertion slot 233a, and the rotating shaft 233 fits around the connecting part 231 through the insertion slot 233a and is able to slide relative to the connecting part 231.

The rotating shaft 233 is located in the accommodating slot 10a and is pivotally connected to the bracket 10. When the two support assemblies 20 are opened up relative to each other, the connecting part 231 is in contact with the second curved concave region 10c, and when the two support assemblies 20 are closed up relative to each other, an end of the connecting part 231 away from the swing arm main body 232 is in contact with the first curved concave region 10b.

The cooperation of the swing arm 23 with the first curved concave region 10b and the second curved concave region 10c that are located at the bottom of the accommodating slot 10a makes a process to close the two support assemblies 20 include a first stage and a second stage. In the first stage, the swing arm 23 slides along a surface of the second curved concave region 10c, and an axis of rotation of the swing arm 23 is an axle center of the second curved concave region 10c. In the second stage, the swing arm 23 slides along a surface of the first curved concave region 10b, and the axis of rotation of the swing arm 23 is an axle center of the first curved concave region 10b. The cooperation of the swing arm 23 with the first curved concave region 10b and the second curved concave region 10c makes a larger distance from the first support 21 to the bracket 10 when the support assemblies 20 are closed up, allowing the first support 21 and the bracket 10 to enclose a larger space for accommodating a folded part of the flexible display. In this way, when the flexible display is folded, the flexible display is more smoothly bent, which is conductive to prolonging the service life of the flexible display.

Figure 12:
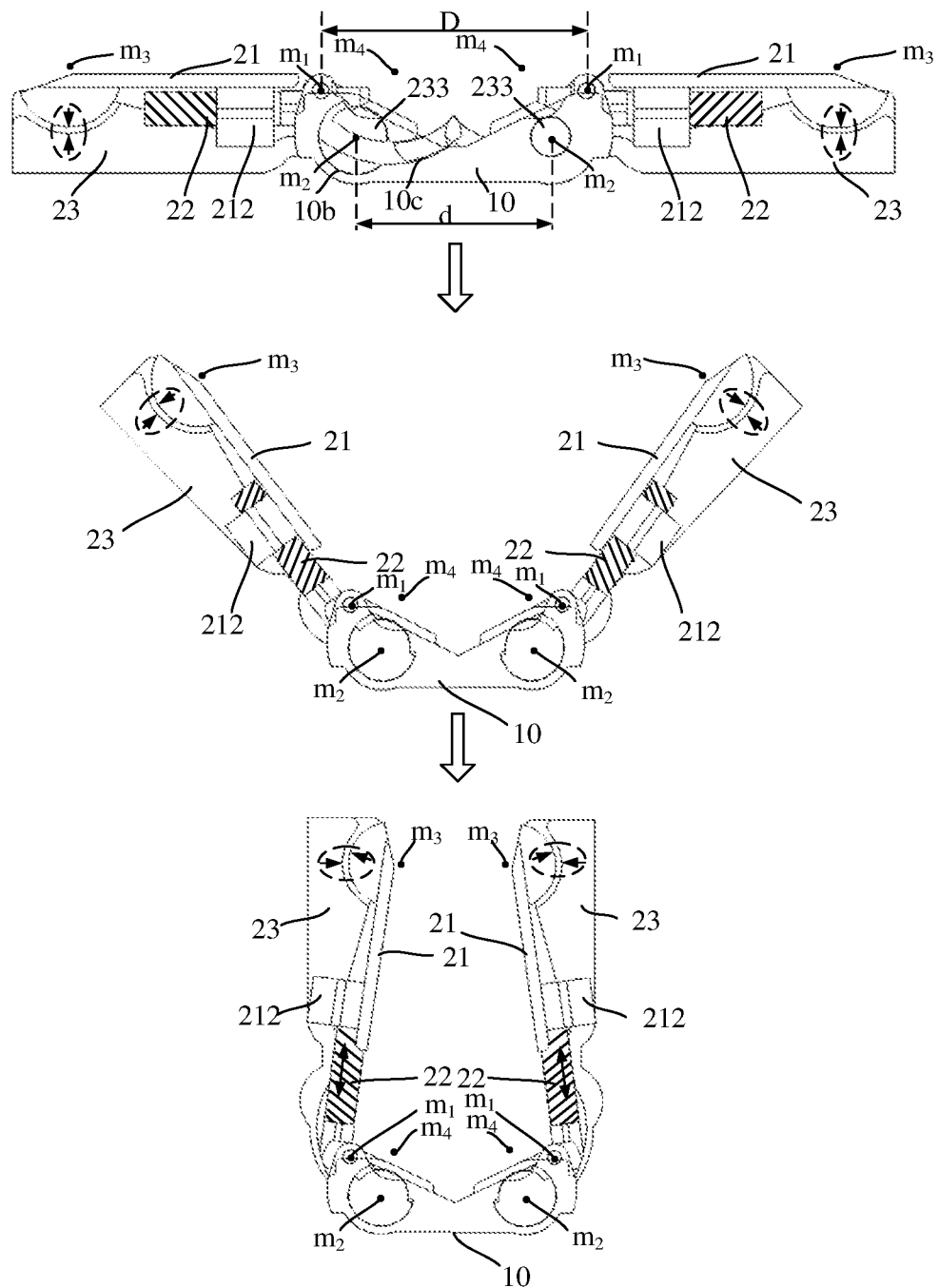
FIG. 12 is a schematic diagram of a closing process of a folding mechanism according to an embodiment of this application.

FIG. 12 is a schematic diagram of a closing process of a folding mechanism according to an embodiment of this application. Referring FIG. 11 and FIG. 12, the rotating shaft 233 is located in the accommodating slot 10a, and the rotating shaft 233 is pivotally connected to the bracket 10, so that the rotating shaft 233 is able to rotate around its own axis (that is, the axis $m_2$ around which the swing arm 23 is pivotally connected to the bracket 10) relative to the bracket 10. When the two support assemblies 20 are opened up relative to each other, a part of the connecting part 231 extending out of the insertion slot 233a of the rotating shaft 233 is in contact with the second curved concave region 10c.

The first stage of the process of closing the two support assemblies 20 is a process of rotation from a state shown in an upper diagram of FIG. 12 to a state shown in a middle diagram of FIG. 12. In the first stage, because the connecting part 231 is still partly in contact with the second curved concave region 10c, the rotating shaft 233 is unable to rotate, in which case the connecting part 231 of the swing arm 23 slides along the second curved concave region 10c, and the swing arm 23 equivalently rotates around an axle center $m_4$ of the second curved concave region 10c. When the swing arm 23 is rotating, the rotating shaft 233 and the connecting part 231 also slide relative to each, the connecting part 231 is partly detached from the insertion slot 233a of the rotating shaft 233, so that a part of the connecting part 231 that is originally in contact with the second curved concave region 10c is retreated into the insertion slot 233a. When the swing arm 23 rotates so that the connecting part 231 is separated from the second curved concave region 10c, the second stage begins.

The second stage of the process of closing the two support assemblies 20 is a process of rotation from the state shown in the middle diagram of FIG. 12 to a state shown in a lower diagram of FIG. 12. In the second stage, the two support assemblies 20 continue to move towards being closed up, in which case the connecting part 231 has been separated from the second curved concave region 10c, and the rotating shaft 233 is able to rotate. During the rotation, an end of the connecting part 231 away from the main body 232 presses against the first curved concave region 10b and slides along the first curved concave region 10b. In the second stage, the swing arm 23 rotates around the axis of the rotating shaft 233 until the two support assemblies 20 are closed up.

The cooperation of the connecting part 231 and the rotating shaft 233 of the swing arm 23 with the first curved concave region 10b and the second curved concave region 10c of the accommodating slot 10a makes a larger distance from an end of the swing arm 23 away from the bracket 10 to the bracket 10 when the support assemblies 20 are closed up than when the support assemblies 20 are opened, which increases a distance from the first support 21 to the bracket 10, allowing the first supports 21 and the bracket 10 to enclose a larger space for accommodating a folded part of the flexible display. In this way, when the flexible display is folded, the flexible display is more smoothly bent, which is conductive to prolonging the service life of the flexible display. Furthermore, the space for accommodating the folded part of the flexible display is increased by increasing the distance between the first support 21 and the bracket 10. Therefore, provided that the space enclosed by the first supports 21 and the bracket 10 is enough to accommodate the folded part of the flexible display, a distance between axle centers of the rotating shafts 233 of the two support assemblies 20 can be appropriately reduced, thereby reducing width of the bracket 10 and thickness of the mobile terminal in a folded state.

As shown in FIG. 12, for the ease of illustrating relative motion between the guide block 212 and the second support 22, filler lines are added to part of the surface of the second support 22; for the ease of illustrating relative motion between the first support 21 and the swing arm 23, arrow symbols are added in dotted ovals in the figure. When the two support assemblies 20 are being closed, the second support 22 and the guide block 212 slide relative to each other. As the two support assemblies 20 are moving towards being closed up, the guide block 212 is sliding gradually along the second support 22 in a direction leaving the bracket 10. When the two support assemblies 20 are closed up, a distance between the guide block 212 and the bracket 10 is maximal. When the two support assemblies 20 are being closed, the first support 21 and the swing arm 23 rotate relative to each other. When the two support assemblies 20 are opened up, an arrow on the surface of the first support 21 is right aligned with an arrow on the surface of the swing arm 23. As the two support assemblies 20 are moving towards being closed, an angle between the two arrows is gradually increasing, indicating that an angle that the first support 21 rotates around the axis $m_3$ relative to the swing arm 23 is also increasing. When the two support assemblies 20 are closed up, an angle that the first support 21 rotates relative to the swing arm 23 is maximal.

Figure 13:
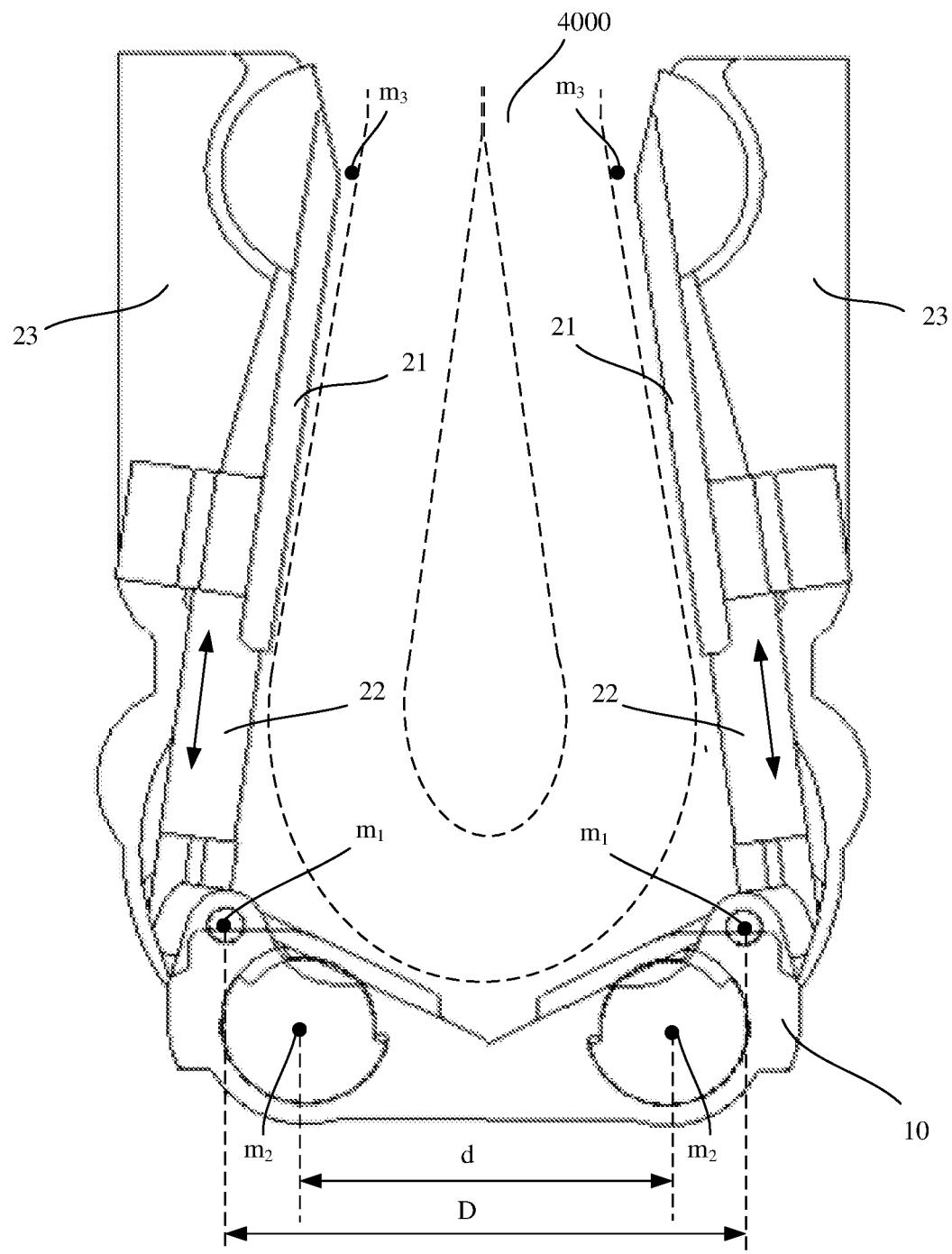
FIG. 13 is a schematic diagram of a folding mechanism being closed up according to an embodiment of this application.

FIG. 13 is a schematic diagram of a folding mechanism being closed up according to an embodiment of this application. FIG. 13 illustrates part of the flexible display 4000 in a folded state using dotted lines. As shown in FIG. 13, a distance d between axle centers of the rotating shafts 233 of the two support assemblies 20 is less than a distance D between the axes $m_1$ around which the second supports 22 of the two support assemblies 20 are pivotally connected to the bracket 10. In other words, the axle center of the rotating shaft 233 is closer to the middle part of the bracket 10 than the axis $m_1$ around which the second support 22 is pivotally connected to the bracket 10. As such, after the support assemblies 20 rotate for 90° to being closed up from being opened up where the two first supports 21 are coplanar, the two first supports 21 have an included angled in between rather than being parallel. Under the limit of the two first supports 21, a drop-like bend is able to be formed in a bending region of the flexible display.

Referring to FIG. 1, for the folding mechanism in the related art, the two first supports 21 are coplanar when the support assemblies 20 are opened up. After the support assemblies 20 rotate for 90° and become closed up, the two first supports 21 are rotated to be in an approximately parallel state. The flexible display 4000 is bent as being U-shaped under the action of the folding mechanism. Referring to FIG. 3, for the folding mechanism of this application, the plate bodies 210 of the two first supports 21 are coplanar when the support assemblies 20 are opened up. The cooperation of the swing arm 23 with the bracket 10 makes a larger distance from an end of the swing arm 23 away from the bracket 10 to the axis $m_2$ when the support assemblies 20 are closed up than when the support assemblies are opened up. Because the first support 21 and the second support 22 are slidably connected, driven by the swing arm 23, the first support 21 slides in a direction leaving the bracket relative to the second support 22, which causes the distance between the first support 21 and the bracket 10 to increase. The two first supports 21 can close up relatively at a position farther away from the bracket 10 so that the two plate bodies 210 have a definite included angle, which enables the flexible display 4000 to be bent to have a drop-like shape in the space A. In comparison with the folding mechanism in the related art, given that the flexible display 4000 has the same thickness when unfolded and the same thickness when folded, the flexible display 4000 has a smoother bend when bent as being drop-shaped, doing less harm to the flexible display 4000, so that the flexible display 4000 can have a longer service life.

Referring to FIG. 11, accommodating slots 10a on two sides of the bracket 10 are staggered in the length direction Y of the bracket 10. In this way, in a case that the swing arm 23 is mounted, the connecting parts 231 of the swing arms 23 of the two support assemblies 20 are staggered in the length direction Y of the bracket 10. When the two support assemblies 20 are opened up, the connecting part 231 of the swing arm 23 penetrates through the insertion slot 233a of the rotating shaft 233 and is in contact with the second curved concave region 10c at the bottom of the accommodating slot 10a, occupying a relatively large space in the bracket 10. The staggered arrangement of the connecting parts 231 of the two swing arms 23 can not only avoid contact between the connecting parts 231 of the two swing arms 23, but also facilitate a less wide bracket 10. This is conductive to further reducing the thickness of the mobile terminal in a folded state.

Optionally, in the swing arm 23, a middle part of an end of the connecting part 231 away from the main body 232 is provided with a notch 231a, and the connecting parts 231 of the swing arms 23 on two sides of the bracket 10 are staggered. When the two support assemblies 20 are opened up, a part of the connecting part 231 of one swing arm 23 is located right in the notch 231a of the connecting part 231 of the other swing arm 23. By providing the notch 231a, contact of the two swing arms 23 can be avoided with no need to stagger them completely, so that the two swing arms 23 will not occupy too much space in the length direction of bracket 10.

The foregoing descriptions are merely embodiments of this application and are not intended to limit this application. Any modification, equivalent replacement, or improvement made without departing from the spirit and principle of this application shall fall within the protection scope of this application.

What is claimed is:

1. A folding mechanism, comprising a bracket and two support assemblies, wherein the two support assemblies are respectively located on two sides of the bracket in a width direction, are both connected to the bracket and are able to be opened and closed relative to each other;
    the support assembly comprises a first support, a second support, and a swing arm, with the second support and the swing arm located on a same side of the first support;
    the second support is pivotally connected to the bracket and is slidably connected to the first support, and the first support is able to slide in a direction approaching or leaving the bracket relative to the second support; and
    one end of the swing arm is pivotally connected to the bracket, the other end of the swing arm is pivotally connected to the first support, and an axis around which the swing arm is pivotally connected to the bracket is spaced apart from an axis around which the second support is pivotally connected to the bracket; wherein:
    the first support comprises a plate body and a guide limiting structure, the guide limiting structure is located on one side of the plate body and is close to the bracket, and the second support is connected to the guide limiting structure; and
        the guide limiting structure comprises two ribs and a plurality of stop pieces, the two ribs are spaced in parallel, the stop pieces are connected to the two ribs respectively, and the plate body, the two ribs, and the stop pieces enclose a channel, and the second support is plate-shaped and is slidably inserted into the channel; or
        the guide limiting structure comprises two ribs, the two ribs are spaced in parallel, a side wall of the rib is provided with a slide groove with the slide grooves of the two ribs opposite each other, and inner walls of the slide and the plate body enclose a guide slot, and the second support is plate-shaped and is slidably inserted into the guide slot.

2. The folding mechanism according to claim 1, wherein the support assembly comprises at least two second supports, and second supports of one support assembly are pivotally connected to the bracket around a common axis.

3. The folding mechanism according to claim 1, wherein the support assembly comprises at least two swing arms, and swing arms of one support assembly are pivotally connected to the bracket around a common axis and are pivotally connected to the first support around a common axis.

4. A mobile terminal, comprising a folding mechanism, a first housing, a second housing, and a flexible display, wherein the folding mechanism is the folding mechanism according to claim 1, the first housing is connected to one swing arm of the folding mechanism, and the second housing is connected to the other swing arm of the folding mechanism, wherein the folding mechanism, the first housing, and the second housing are located on a same side of the flexible display, and the flexible display is connected to the first housing and the second housing.

5. The folding mechanism according to claim 1, wherein the bracket includes a plurality of sub-brackets detachably connected in a length direction of the bracket.

6. The folding mechanism according to claim 5, wherein the plurality of sub-brackets are fixedly connected.

7. A folding mechanism, comprising a bracket and two support assemblies, wherein the two support assemblies are respectively located on two sides of the bracket in a width direction, and both connected to the bracket and are able to be opened and closed relative to each other;
    the support assembly comprises a first support, a second support, and a swing arm, with the second support and the swing arm located on a same side of the first support;
    the second support is pivotally connected to the bracket and is slidably connected to the first support, and the first support is able to slide in a direction approaching or leaving the bracket relative to the second support; and
    one end of the swing arm is pivotally connected to the bracket, the other end of the swing arm is pivotally connected to the first support, and an axis around which the swing arm is pivotally connected to the bracket is spaced apart form an axis around which the second support is pivotally connected to the bracket;
    wherein the first support comprises a plate body and two curved arms, the curved arms are located on one side of the plate body and are close to the swing arm, one end of the curved arm is connected to the plate body, an opening of the curved arm faces towards the plate body, and the two curved arms are parallel and spaced apart from each other; and
    a recess is provided on a side of the swing arm close to the plate body, a bottom of the recess is a curved plane, and the curved arms are located in the recess and are able to slide along the bottom of the recess.

8. The folding mechanism according to claim 7, wherein a bump is provided at a middle part of the bottom of the recess, two limit baffles are provided on a surface of the bump, the two limit baffles are located on two opposite sides of the bump in a length direction of the recess, and a gap is present between the limit baffle and the bottom of the recess; and
    the bump is located between the two curved arms, and the curved arms are able to be slidably inserted into the gap.

9. The folding mechanism according to claim 7, wherein the curved arms are connected to the recess of the swing arm, with the surface of the curved arms in contact with the bottom of the recess.

10. A mobile terminal, comprising a folding mechanism, a first housing, a second housing, and a flexible display, wherein the folding mechanism is the folding mechanism according to claim 7, the first housing is connected to one swing arm of the folding mechanism, and the second housing is connected to the other swing arm of the folding mechanism, wherein the folding mechanism, the first housing, and the second housing are located on a same side of the flexible display, and the flexible display is connected to the first housing and the second housing.

11. A folding mechanism, comprising a bracket and two support assemblies, wherein the two support assemblies are respectively located on two sides of the bracket in a width direction, are both connected to the bracket and are able to be opened and closed relative to each other;
the support assembly comprises a first support, a second support, and a swing are, with the second support and the swing arm located on a same side of the first support;
the second support is pivotally connected to the bracket and is slidably connected to the first support, and the first support is able to slide in a direction approaching or leaving the bracket relative to the second support; and
one end of the swing arm is pivotally connected to the bracket, the other end of the swing arm is pivotally connected to the first support, and an axis around which the swing arm is pivotally connected to the bracket is spaced apart from an axis around which the second support is pivotally connected to the bracket; wherein:
an accommodating slot is provided on each of two sides of the bracket in the width direction, and the accommodating slot extends in a length direction of the bracket, wherein a bottom of the accommodating slot is provided with a first curved concave region and a second curved concave region, the first curved concave region adjoining the second curved concave region in the width direction of the bracket, with the first curved concave region closer to an edge of the bracket and the second curved concave region farther away from the edge of the bracket, and a radius of the first curved concave region smaller than that of the second curved concave region; and
the swing arm is partly located in the accommodating slot and is in contact with the bottom of the accommodating slot, and is able to slide on the first curved concave region and the second curved concave region.

12. The folding mechanism according to claim 11, wherein the swing arm comprises a swing arm main body, a rotating shaft, and a connecting part, with the connecting part located at one end of the swing arm main body in a length direction and the connecting part being curved, a side wall of the rotating shaft is provided with an insertion slot, and the rotating shaft fits around the connecting part through the insertion slot and is able to slide relative to the connecting part; and
the rotating shaft is located in the accommodating slot and is pivotally connected to the bracket, wherein when the two support assemblies are opened up relative to each other, the connecting part is in contact with the second curved concave region, and when the two support assemblies are closed up relative to each other, an end of the connecting part away from the swing arm main body is in contact with the first curved concave region.

13. The folding mechanism according to claim 12, wherein a distance between axle centers of the rotating shafts of the two support assemblies is smaller than a distance between axes around which the second supports of the two support assemblies are pivotally connected to the bracket.

14. The folding mechanism according to claim 12, wherein the connecting parts of the two swing arms are staggered in the length direction of the bracket.

15. The folding mechanism according to claim 14, wherein in the swing arm, a middle part of an end of the connecting part away from the main body is provided with a notch, when the two support assemblies are opened up, a part of the connecting part of one swing arm is located right in the notch of the connecting part of the other swing arm.

16. A mobile terminal, comprising a folding mechanism, a first housing, a second housing, and a flexible display, wherein the folding mechanism is the folding mechanism according to claim 11, the first housing is connected to one swing arm of the folding mechanism, and the second housing is connected to the other swing arm of the folding mechanism, wherein the folding mechanism, the first housing, and the second housing are located on a same side of the flexible display, and the flexible display is connected to the first housing and the second housing.

* * * * *